United States Patent
Kessel et al.

(10) Patent No.: US 6,422,406 B1
(45) Date of Patent: Jul. 23, 2002

(54) WIRE RACK FOR WINE BOTTLES AND THE LIKE

(75) Inventors: Steven M. Kessel, Loganville; Peterjohn R. C. Walters, Decatur; Jerry W. Thompson, Social Circle, all of GA (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 09/666,695

(22) Filed: Sep. 21, 2000

(51) Int. Cl.[7] ................................. A47F 5/14
(52) U.S. Cl. .................. 211/181.1; 211/74; 211/49.1
(58) Field of Search .................. 211/74, 186, 187, 211/181.1, 49.1, 85.18, 85.31, 90.02–90.04, 153, 184; 108/144.11, 106, 107, 147.11, 147.12, 147.13, 147.16; D6/566, 462, 458; 248/153, 175, 302

(56) References Cited

U.S. PATENT DOCUMENTS

| | | | | |
|---|---|---|---|---|
| 1,645,533 A | * | 10/1927 | Jarvis | 211/181.1 |
| 1,992,411 A | * | 2/1935 | Bruce | 211/74 |
| D96,291 S | | 7/1935 | Wright | |
| 2,205,064 A | * | 6/1940 | Irwin | 211/181.1 |
| 2,249,234 A | * | 7/1941 | Srodulski | |
| 2,256,995 A | * | 9/1941 | Andres | |
| 2,562,497 A | * | 7/1951 | Klein | 211/181.1 |
| 2,622,741 A | | 12/1952 | Bamert | |
| 3,252,434 A | * | 5/1966 | Young, Jr. | 211/181.1 |
| 3,388,808 A | | 6/1968 | Radek | |
| 3,439,811 A | * | 4/1969 | Bell | |
| 3,481,484 A | * | 12/1969 | Mihills | |
| 3,517,606 A | * | 6/1970 | Myles et al. | 211/181.1 |
| 3,587,865 A | * | 6/1971 | Phillips | 211/181.1 |
| 3,680,712 A | | 8/1972 | Jurasek | |
| 3,757,705 A | | 9/1973 | Maslow | |
| 3,804,482 A | | 4/1974 | Smith | |
| 3,836,008 A | * | 9/1974 | Mraz | 211/49.1 |
| 4,023,681 A | | 5/1977 | Plant | |
| 4,095,858 A | * | 6/1978 | Hopf | 211/194 |
| 4,220,245 A | | 9/1980 | Corcoran | |
| 4,331,243 A | * | 5/1982 | Doll | 211/49.1 |
| 4,546,887 A | | 10/1985 | Cohn | |
| 4,697,712 A | * | 10/1987 | Valiulis | 211/187 |
| D312,362 S | * | 11/1990 | Wightman | D6/462 |
| 4,998,631 A | * | 3/1991 | Fridjhon | 211/74 |
| 5,027,959 A | * | 7/1991 | Luukkonen | 211/186 |
| D342,397 S | * | 12/1993 | MacDonald | D6/462 |
| 5,314,244 A | * | 5/1994 | Swets et al. | 211/181.1 |
| 5,685,236 A | * | 11/1997 | Lechman | 108/110 |
| 5,699,744 A | * | 12/1997 | Lechman | 108/109 |
| 5,775,522 A | * | 7/1998 | Martin, Sr. | 211/184 |
| 5,779,070 A | * | 7/1998 | Dickinson et al. | 211/187 |
| 6,116,436 A | * | 9/2000 | Ferrucci et al. | 211/187 |

* cited by examiner

Primary Examiner—Daniel P. Stodola
Assistant Examiner—Jennifer E. Novosad
(74) Attorney, Agent, or Firm—Michael Best & Friedrich LLC

(57) ABSTRACT

A number of panels and shelves are formed of wires which are arranged to intersect. These panels and shelves are secured together to form a rack for holding bottles, where by rack is supported by four corner posts. The vertical placement of the shelves is adjustable along the height of the corner posts by use of adjustable support collars which fit around each post and are captured by each corner of a shelf. A plurality of A-frames are removably secured to the shelves to form areas or compartments in which the bottles or the like may be stored. The A-frames are positioned next to each other so as to support an inverted pyramid of bottles between them.

9 Claims, 6 Drawing Sheets

WIRE RACK FOR WINE BOTTLES AND THE LIKE

FIELD OF THE INVENTION

This invention relates to storage and display racks and more particularly—but not exclusively—to wire wine racks which may be easily and quickly assembled and disassembled without the need for tools.

BACKGROUND OF THE INVENTION

For convenience of expression, the inventive rack will hereinafter be called a "wine rack"; although, it should be apparent that the inventive rack has many uses other than for storage of wine. The wine rack may have almost any convenient size and shape. In general, the dimensions of a wine shelf might be in the nature of 14"×48" and, perhaps 84" tall. An example of such racks may be found in U.S. Pat. Nos. 4,546,887 and 2,622,741.

Regardless of the assembled size, it is desirable to have a rack which may be shipped broken down into its component parts in a relatively small box. Also, it should be very easy to quickly assemble the rack into its useable form or to disassemble it for storage. Once it is assembled, it should be secure and stable.

SUMMARY OF THE INVENTION

A particularly useful form of construction which meets these criteria is a rack made of a plurality of preferably cold rolled steel wires which intersect each other and are preferably welded together at each point where the wires intersect. In the preferred embodiment, the wires form an orthogonal matrix to form shelves and panels.

Accordingly, an object of the invention is to provide a rack having the features described above. Here an object is to provide such a rack which is especially adapted for wine or bottle storage but which may also be used for other purposes. For example, four rack shelves might provide for wine storage while a fifth shelf might store other things such as glasses, napkins, nuts, chips, and the like. Hence, flexibility of design and usage is desirable.

In keeping with an aspect of the invention, these and other objects are provided by a series of wire panels and shelves which easily fit together without the need for tools. The shelves may be assembled in either a flat and completely horizontal position for general storage or on a slant for wine bottle storage. Once the shelves are in position, a suitable number of A-frames may be secured to each shelf in order to receive rows of bottles between the slanting sides of the A-frame, forming space-efficient storage compartments.

DETAILED DESCRIPTION OF THE INVENTION

Figure 1:
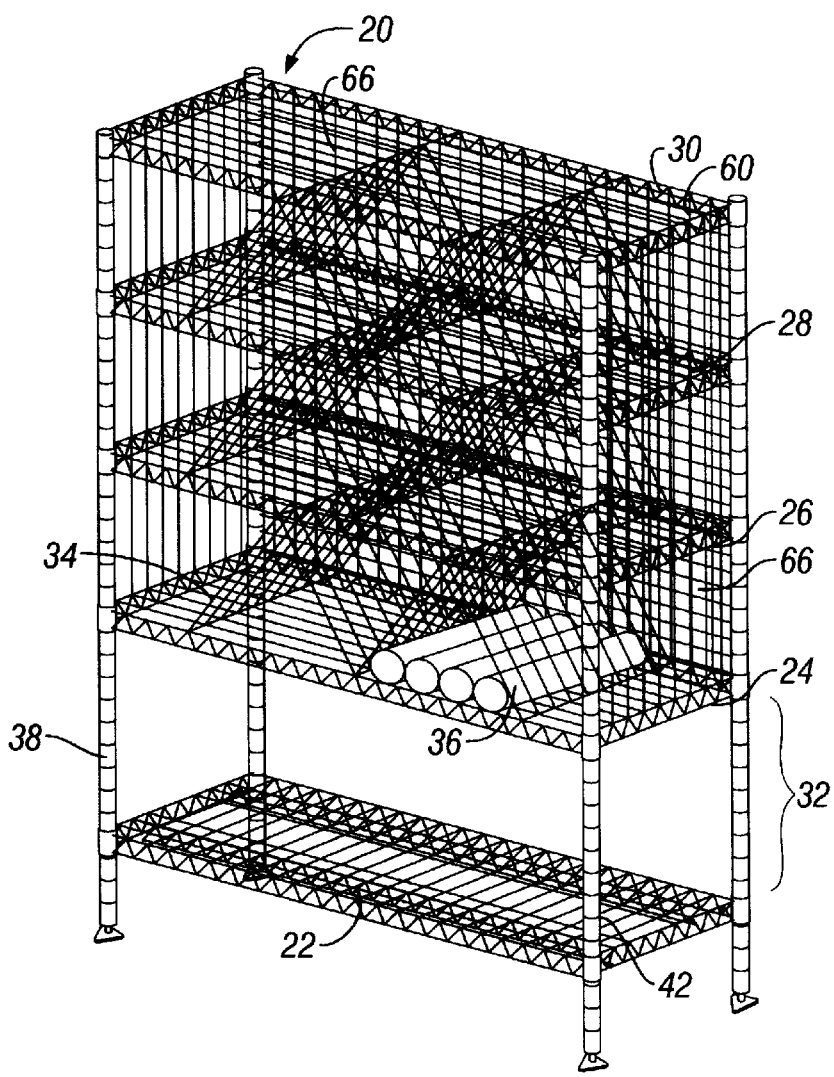
FIG. 1 is a front view of an assembled inventive wine rack having two exemplary sets of A-frames on each of three shelves.

FIG. 1 shows the inventive wine rack having four exemplary shelves 22–28 and a top panel 30. A suitable space 32 is provided to receive any additional shelves or stacked items such as ice buckets, napkins, glasses, etc., as the user of the shelves may elect. As here shown, two sets of bottle supporting A-frames 34, 36 have been secured to shelf 24 in order to receive wine bottles. Similar A-frames are shown secured to the other shelves 26, 28.

The entire wine rack 20 is preferably made of shelves and panels comprising two layers of cold rolled steel wire or rods which intersect each other in an orthogonal matrix and are preferably welded together at each crossing or intersection. These wires are shown and are hereinafter described as being in the preferred orthogonal orientation; however, the wires may have many different orientations such as diagonal or even simple spaced wires parallel to each other. The method of assembly (or disassembly) should be apparent from a study of the following specification and the drawings explained therein.

The corner posts 38–44 (FIG. 4) are, in effect, hollow tubes or pipes having circumferential grooves or channels, such as 46 (FIG. 3) formed periodically along the length of the posts. These grooves may appear at one inch intervals for most corner to posts.

A plastic collar 48 (FIG. 3) has at least one internal ridge which fits into a selected one or more of the circumferential grooves or channels on the corner posts. For example, U.S. Pat. No. 5,127,342 discloses an adjustable shelving system with a type of collar that can be used in connection with the present invention. Then, a second collar 50 slips over the collar 48 in order to lock it into place. The collars on the front corner posts 38, 42 may be placed in circumferential channels which are an inch or two lower than the vertical positions of the collars on the rear posts, thereby providing slanting shelves (see shelf supports at 24–28 in FIG. 8) for supporting wine bottles with their corks in a higher position. Or, they may be placed in the same relative vertical positions on both the front and rear posts, thereby providing horizontal shelves. A number 52 may appear between grooves on the corner posts to assist in positioning the collars, these numbers 52 preferably extend along the entire length of the corner posts (see FIG. 13).

Figure 2:
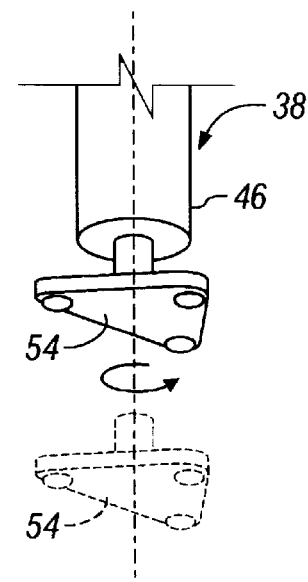
FIG. 2 is a perspective view of two feet attached to vertical corner posts of a wine rack.

To begin the assembly, the collars 48, 50 are put into place and feet 54, 56 (FIG. 2) are attached to the bottom of the corner posts 38–44. Then, the corner couplers 53 of shelf 22 are fitted over the plastic collars 48, 50. Both the collars and corner couplers 53 may be simple, tapered, ring-shaped members with the couplers 53 fitting over the tapered collars 48, 50 and resting on a circumferential stop 58. The nesting taper of the collar 50 and coupler 53 carries most of the shelf weight.

Any suitable number of shelves 24–30 (FIG. 5) are added to the corner posts 38–44 in a similar manner, either filling it completely or leaving space 32 for uses other than the storage of bottles.

Figure 7:
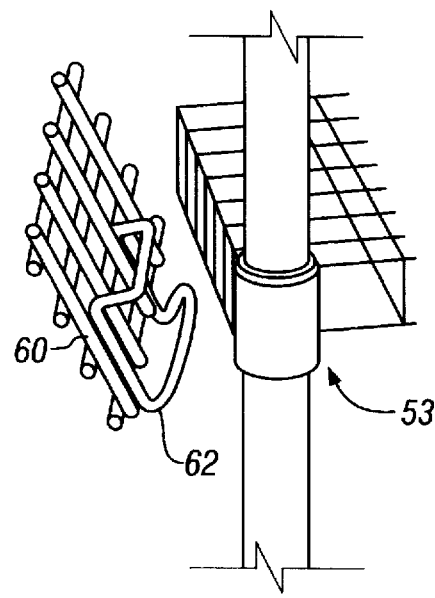
FIG. 7 is a perspective view giving a detail of a hook used to hold the back panel in its final position.

The rack is now ready for a back panel 60 to be installed. For this, both the top and the bottom of the panel have upwardly facing open hooks thereon. FIG. 7 shows the bottom hook 62. The top of the panel also has upwardly facing hooks 64 (best seen on the side panel (FIG. 8)).

Figure 5:
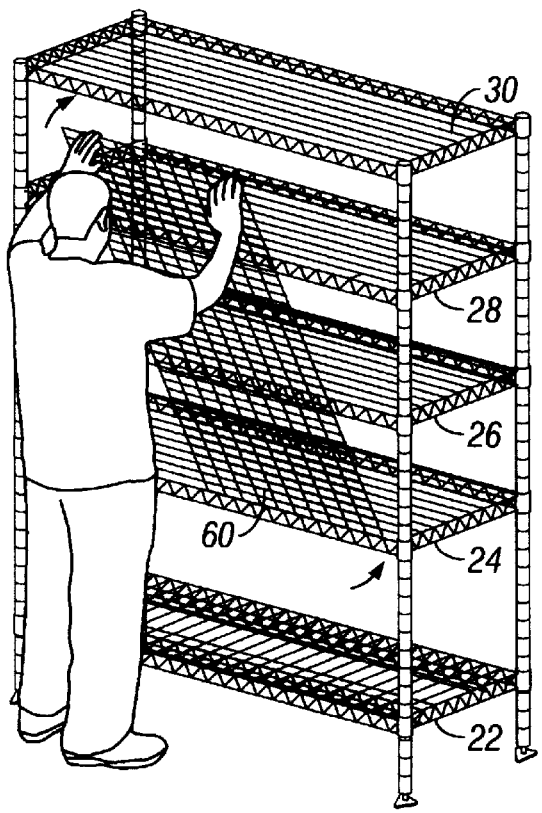
FIG. 5 is a perspective view of a wine rack with a plurality of shelves in place on the vertical corner posts and at the start of a back panel installation.

As shown in FIG. 5, first the hooks 62 on the bottom of back panel 60 are hooked under an edge of a shelf, such as bottom shelf 24, for example. Then, the back panel is bowed outwardly (FIG. 6) in order to lower the upwardly facing hooks on the top of the back panel 60 so that they may be slipped under an edge of a shelf, such as top shelf 30. The bowed back panel is released and its resilience drives the upwardly facing hooks to be captured under the shelf.

The construction of the back panel is preferably an orthogonal matrix of wires which may be welded together at each cross point. Any other suitable geometric configuration may also be used. This arrangement provides a back panel having a number of rectangular openings such as 66 (FIG. 1). The only requirement is that these openings should be small enough to prevent the wine bottles from falling off the back of the shelves.

Figure 8:
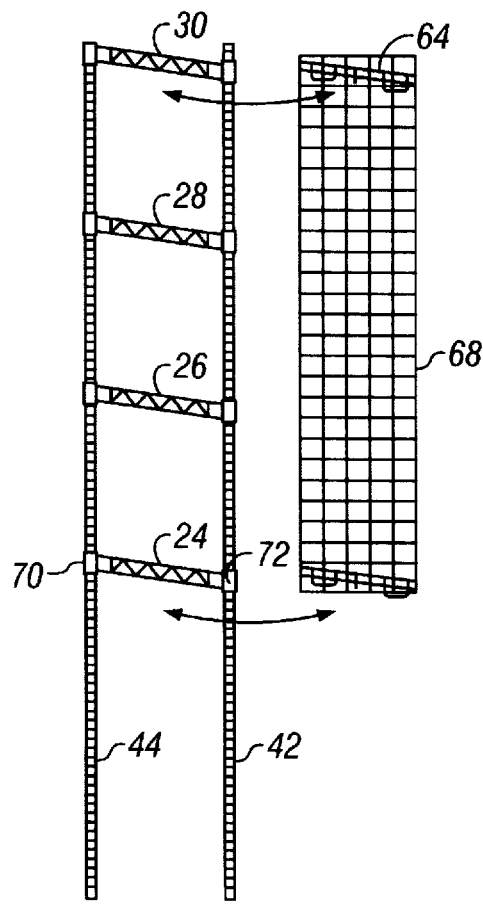
FIG. 8 is a side elevation view showing two corner posts ready to receive a side panel.
Figure 9:
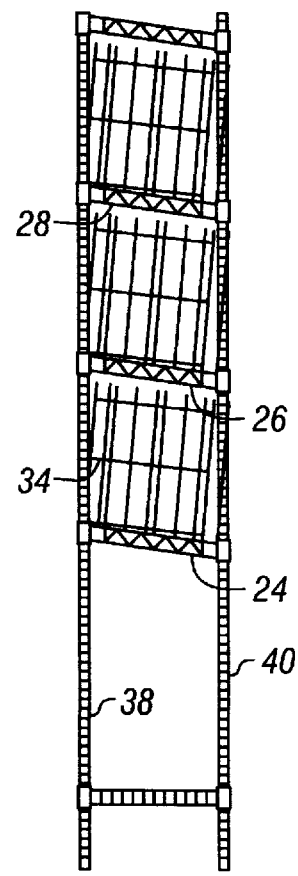
FIG. 9 is a side elevation showing an assembly of the corner posts and A-frames.

The shelves are now ready to receive their side panels (FIGS. 8, 9). As here shown, the shelves slant downwardly from 70 on rear post 44 to 72 on the front post 42. This way, corks will remain wet when the wine bottles are laid on the rack with their neck pointing toward the rear of the rack (i.e., toward rear corner post 42). For example, the shelf supports may be located as follows:

| SHELF | POSITION ON REAR POST | POSITION ON FRONT POST |
| --- | --- | --- |
| Shelf 26 | 56" | 55" |
| Shelf 28 | 71" | 70" |
| Shelf 30 | 86" | 85" |

Figure 3:
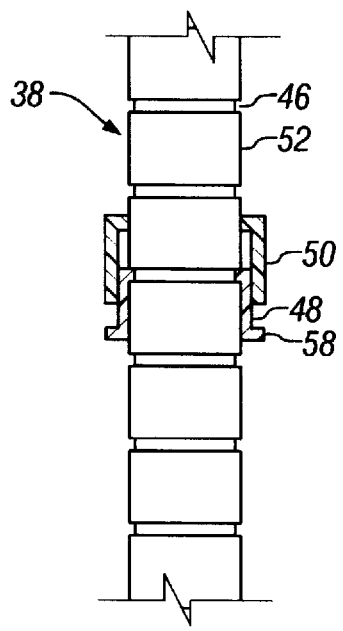
FIG. 3 is a side elevation of plastic shelf supporting collars which are positioned on a corner post.
Figure 4:
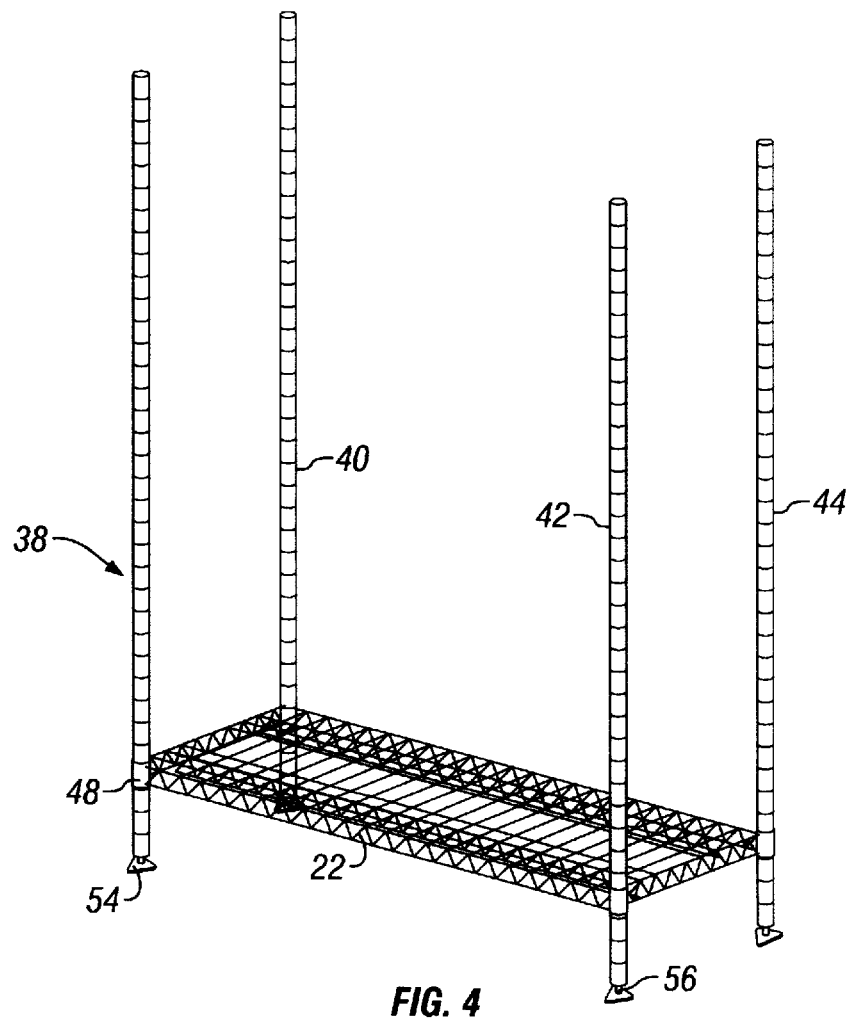
FIG. 4 is a perspective view of a first step in assembling a rack.

Of course, other spacings could also be provided. Or, the shelves could also be level and horizontal if the collars of FIG. 3 are positioned at the same height on the front and rear posts.

Figure 6:
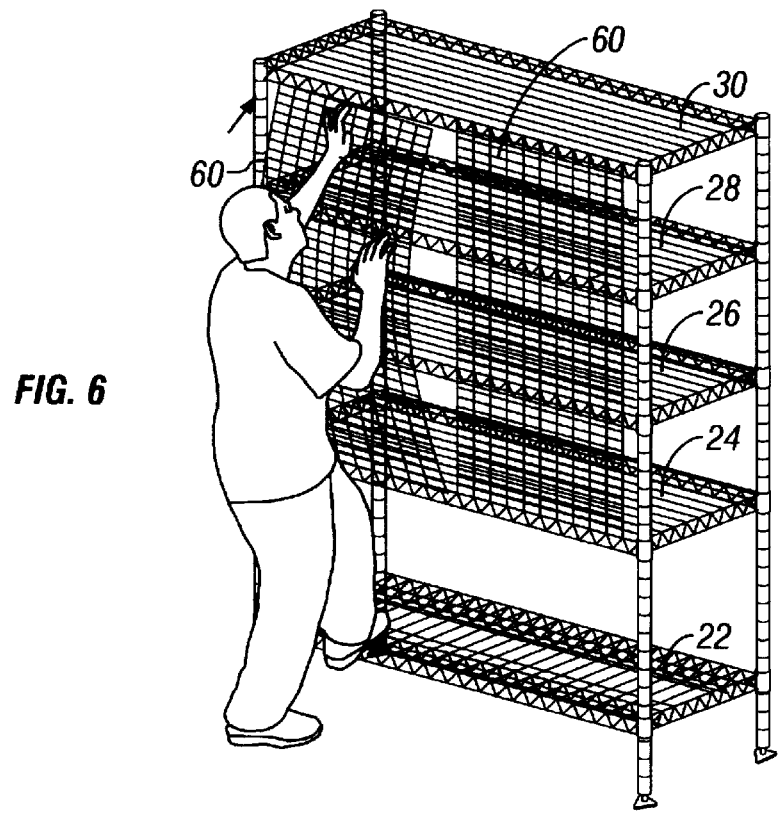
FIG. 6 is a perspective view of a wine rack with a back panel being snapped into place.

The side panels 68 (FIGS. 8, 9) are installed in approximately the same manner that is shown in FIGS. 5, 6 for the back panel. FIG. 9 shows the side panel 68 in place on the rack. Again, the side panel is here shown, by way of example, as an orthogonal matrix of wires preferably welded together at each cross point, although other configurations could also be used.

Figure 10:
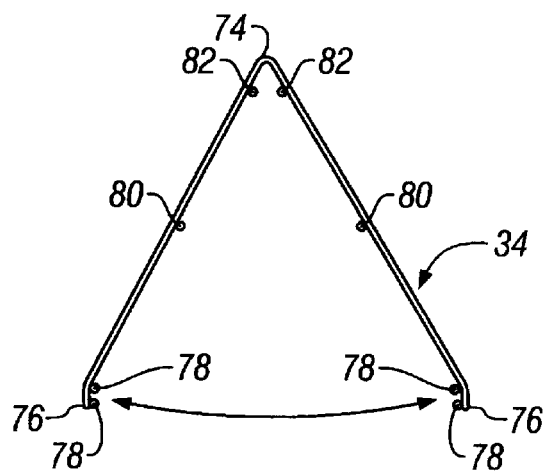
FIG. 10 is a front elevation of an A-frame which provides support for bottles stored on a rack shelf.

The shelves are now ready to receive the bottle supporting A-frames 34, 36 (FIG. 10). These frames are formed by resilient wire arms 71 bent at an acute angle 74 at an apex with two free ends 76 opposite the apex. A number of cross members 76–82 extend across and are welded to each wire arm 71 to form the A-frame 34.

FIGS. 1 and 9 show a front view and side view, respectively, of an exemplary wine rack, here having three shelves 24–28 for storing wine bottles. A plurality of A-frames 34, 36, are secured to the shelves in a side-by-side relationship. A pyramid of bottles may be supported under each set of the A-frames and an inverted pyramid may be supported between two sets of A-frames (FIG. 13).

The lower portion or free ends 76 of the wire members 71 are adapted to fit between and grasp the individual wire members which form the shelf surface or matrix on each individual shelf. A pair of cross members 78 which extend across the lower free ends 76 of each arm of the A-frames capture and hold between them an individual wire member on the shelf surface to secure the A-frame to the shelf. To install the A-frames shown in FIGS. 11–13, the bent wires 71 are spread apart and the pair of cross members 78 on the free ends of the wires 71 are fitted over the wires that form the shelves. Then, the A-frame wires 34 are released whereupon the resilience of the wires 71 cause them to return to normal with the shelf wire captured between the cross members 78. When the cross members are disposed on the outside of the A-frame (FIG. 13), the two arms are squeezed together, inserted into the shelf wiring, and released. Then, each of the cross members 78 captures a shelf wire adjacent the free ends of A-frame wires 34.

Figure 11:
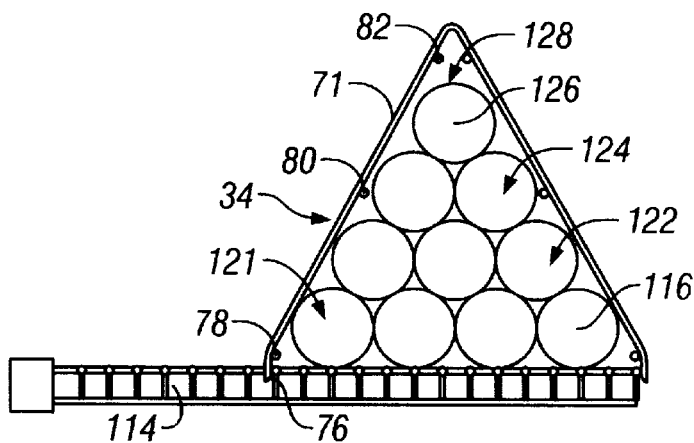
FIG. 11 is a front elevation which shows a pyramid of bottles stored in an A-frame mounted on a shelf.
Figure 12:
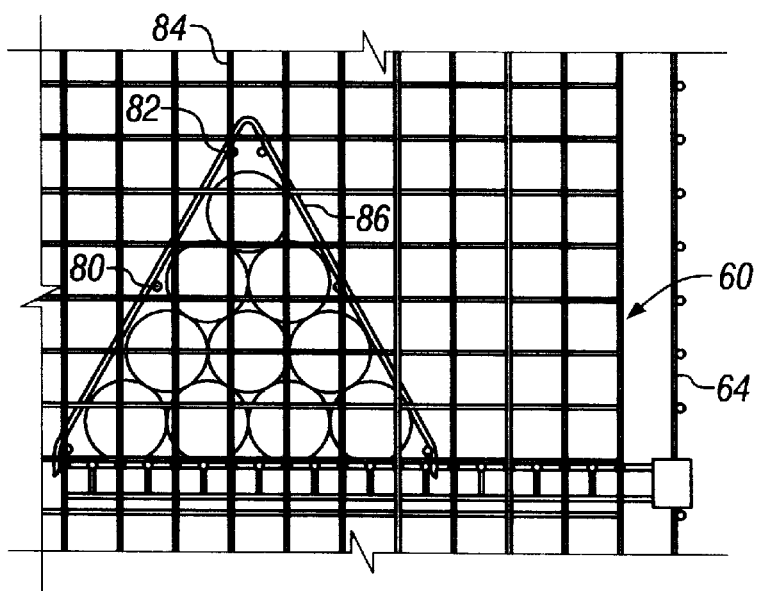
FIG. 12 is a back elevation of substantially the same equipment that is shown in FIG. 11 with the back panel in place to prevent either the bottles from falling off the back of the shelves.
Figure 13:
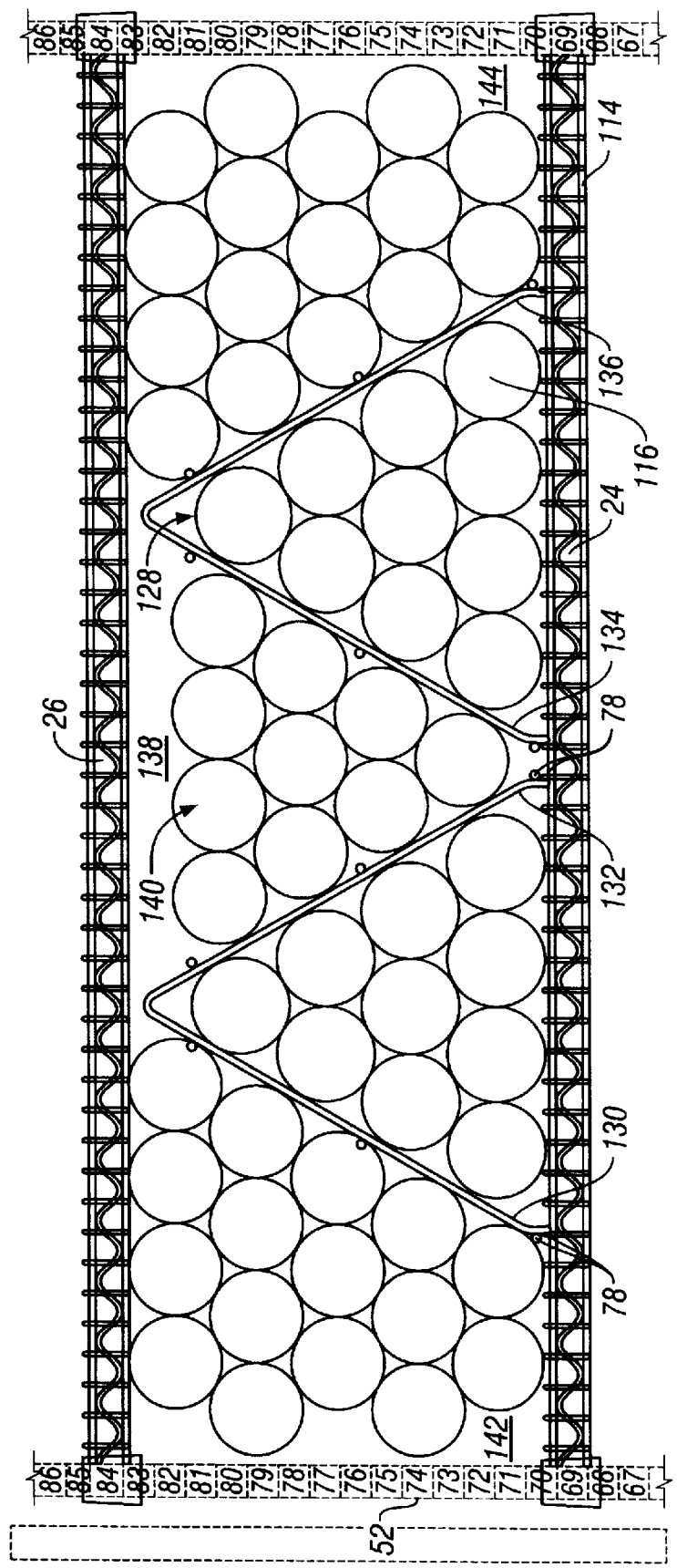
FIG. 13 shows a full shelf having two sets of A-frames, arranged to support 62 bottles.

FIGS. 11–13 show a rear view of a shelf 114 with an A-frame in place. The bottom of a wine bottle 116 is shown. By an inspection, it is seen that, the width of the space between the A-frame arms is adequate to receive a first row 121 (FIG. 11) comprising a fixed number (here four) of bottles 116. The second row 122 includes one less (three) bottle. In a similar manner, the third row 124 includes one less (two) bottle. Finally, the top "row" 126 is a single bottle completing the pyramid 128 of bottles. It is obvious from an inspection of FIGS. 11–13 that the dimensions of the A-frame are such that the entire pyramid is held securely in place.

FIG. 12 is a view similar to FIG. 11, except that it is taken looking through back panel 60. The spacing between the wires of the matrix forming the back panel is such that a wire is always in a position to prevent a bottle from sliding through and protruding behind the back panel.

From FIG. 13, it is seen that the space 138 between two adjacent A-frame sides 132 and 134 is adapted to receive an inverted pyramid 140 of bottles, while the A-frames also form end zones 142, 144.

Those who are skilled in the art will readily perceive various modifications which fall within the scope and spirit of the invention. Therefore, the appended claims are to be construed to include all equivalent structures.

The claimed invention is:

1. A wire rack for storing bottles, said rack comprising: a plurality of panels, each formed by a matrix of intersecting wires; said panels defining a back, sides, and shelves extending between said sides of said wire rack; and at least one A-frame adapted to be removably secured to the wire matrix of at least one of said shelves, said A-frame having dimensions for supporting said plurality of bottles in the form of a pyramid stacked under said A-frame, and said A-frame comprising a plurality of resilient wires bent to form an acute angle at an apex with a pair of free ends opposite said apex, said free ends adapted for engagement with the wire matrix of each of said shelves to fit between and grasp selected wires in said wire matrix.

2. The wire rack of claim 1 wherein there are at least two of said A-frames positioned side by side on said at least one of said shelves so that an inverted pyramid of bottles may be stacked between said A-frames.

3. The wire rack of claim 1 further comprising a plurality of corner posts having shelf support means for attaching said shelves thereto, said support means being vertically adjustable so that said shelves may be in either a horizontal position for general storage or a slanted position for storage of the bottles.

4. The wire rack of claim 3 wherein each of said corner posts has grooves arranged at predetermined intervals along a length of said post and a plastic collar that fits into a selected one of said grooves for receiving and supporting a corner of each of said plurality of shelves whereby said shelves may be installed in either said horizontal or said slanted position by placing said collars in selected ones of said grooves.

5. A rack of shelves for storing a plurality of items each with a circular cross section comprising: four corner posts, each of said posts having grooves formed at predetermined intervals along a length thereof, a collar associated with each post and dimensioned to be mounted on said post for supporting a corner of each of said shelves, said collars being secured in selected grooves on each post at each location where a shelf is to be supported, and a plurality of A-frames adapted to be removably secured to said shelves, the A-frames having dimensions for storing a pyramid of said circular items within each of said A-frames and each A-frame comprising a plurality of resilient wires bent to form an acute angle having an apex and a pair of free ends opposite said apex and said shelves are each formed by a wire matrix, the A-frames being removably secured to one of said plurality of shelves by urging said pair of free ends to fit between and grasp selected wires in said shelf matrix.

6. The rack of claim 5 wherein said rack has side and back panels each being formed by an orthogonal matrix of wires welded together at their crossings; said side and back panels having hooks on each end; a distance between said hooks being such that said panels may be installed by bowing the panels to hook them to one of said plurality of shelves at one end of said panels and to hook the panels to another one of said plurality of shelves at an opposite end of said panels as said bowed panels are released.

7. The rack of claim 6 wherein the items with a circular cross section are bottles and shelves slant downwardly toward the front of the rack.

8. A rack for storing bottles comprising: a plurality of shelves, each of said shelves being made of a matrix of intersecting wires, said shelves being mounted between vertical corner posts, said corner posts having means for adjusting the vertical position of said shelves, a plurality of A-frames secured to selected ones of said shelf wires, said A-frames being in a side-by-side relationship in one direction extending along a length of said shelves whereby a plurality of compartments are formed by said A-frames for supporting said bottles in said compartments formed by said A-frames, and said means for adjusting the positions of said shelves cause said shelves to slant toward a front edge of said shelves.

9. The rack of claim 8 wherein said A-frames each comprise a plurality of resilient wires bent to form an acute angle at an apex and having free ends opposite said apex for engaging the matrix of wires forming each of said shelves.

* * * * *